June 8, 1937.  H. LEDWINKA  2,083,457

ROAD VEHICLE

Original Filed June 21, 1932   2 Sheets-Sheet 1

Inventor,
Hans Ledwinka,
By Church & Church
His Attorneys

Patented June 8, 1937

2,083,457

UNITED STATES PATENT OFFICE 2,083,457

ROAD VEHICLE

Hans Ledwinka, Koprivnice, Czechoslovakia

Application June 21, 1932, Serial No. 618,525
Renewed May 6, 1936. In Czechoslovakia
December 18, 1930

2 Claims. (Cl. 280—106.5)

Tubular carrier members replacing the usual vehicle frames, in combination with swinging half-axles connected to the tubular carrier members, have heretofore been used almost always only in cases where the half-axles carried driven wheels, because in this connection the tubular carrier members were adapted to receive the driving shaft.

With vehicles having tubular carrier members it has already been proposed to support the non-driven front wheels upon swinging half-axles, in which connection the inner ends of the half-axles were connected to the engine-gear bed-plate; this formation of non-driven rotatable axles however had no intimate connection with the presence of a tubular carrier member but might have been used just as well with vehicles without tubular carrier members.

The invention consists in the feature that non-driven vehicles wheels are carried by swinging axles and by springs which are secured to a tubular carrier member by means of suitable intermediate elements. Notwithstanding that the presence of a central tubular carrier member for the reception of the longitudinal driving shaft is superfluous with non-driven vehicles, for example with power-vehicle trailers, nevertheless the arrangement of the non-driven wheels on a tubular carrier member is particularly advantageous for the reason that the tubular carrier member facilitates without any difficulty and in a particularly simple manner a construction of the vehicle of any desired length, also the provision of one or more pairs of wheels in any desired position.

According to the invention each half-axle together with its bearings, or each spring with its fixing parts, forms one unit which can be fixed at any desired place upon the tube forming the carrier member. The bearings of two correlated half-axles together with the spring supports belonging thereto may constitute an interconnected unit which is formed as a sleeve and is pushed upon the tubular carrier member or is inserted between two sections of the carrier member arranged one behind the other.

Further, according to the invention the member which is combined with the tubular carrier member is not only utilized for the disposition of the front wheels and the springs belonging thereto, but also for carrying the steering gear, so that the entire front axle together with front wheels, steering gear, and springs, forms as a whole one composite unit adapted to be combined with the front end of the tubular carrier frame and preferably adapted to be pushed upon the same.

According to the invention an internal combustion engine serving for the drive of the driving wheels, in some cases together with the change-gear, can also be detachably attached by flanges to the rear end of the tubular vehicle frame, so that its housing and in some cases also the housing of the gearing forms a continuation of the tubular vehicle frame.

The invention is diagrammatically illustrated in constructional examples in the accompanying drawings, in which Figs. 1 and 2 show one constructional form of the invention in transverse section and plan respectively;

Figure 1:
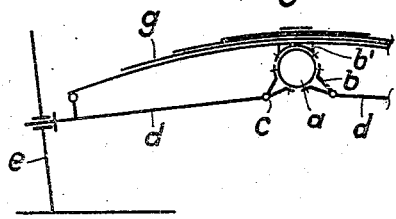
Figure 2:
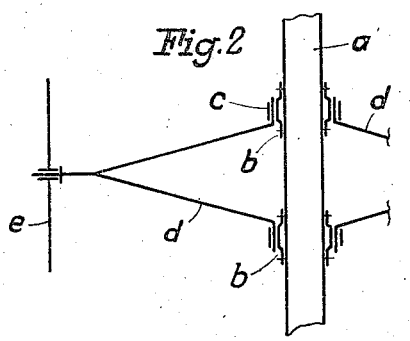

Referring to the drawings, in the constructional example illustrated in Figs. 1 and 2, on the outside of a tubular carrier member $a$ seperate bearing blocks $b$, $b'$, are directly mounted with correspondingly formed bearing surfaces and are secured by screws or the like. The blocks $b$ carry the bearings $c$ for the inner ends of the half-axles $d$ upon the outer ends of which the running wheels $e$ are mounted. The bearing block $d'$ carries a transverse spring $g$ extending over the carrier member $a$ and supporting the outer ends of the half-axles $d$.

Figure 3:
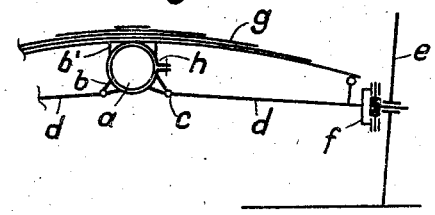
Figs. 3 and 4 show a second constructional form of the invention also in transverse section and plan.
Figure 4:
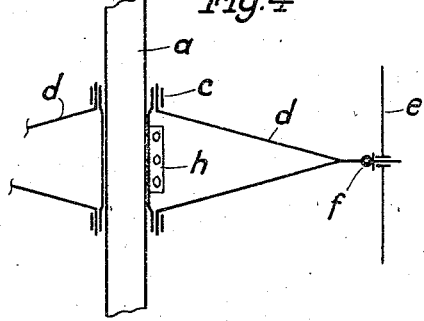

In the constructional examples illustrated in Figs. 3 and 4 the bearing blocks $b$, $b'$ are combined with a sleeve $h$. The sleeve $h$ surrounds the carrier member $a$ and can be fixed upon the same in any desired position, for example by a slotted construction.

In order to avoid the use of a bogey for the front axle and also with drawn vehicles, for instance, with trailers of loaded power-vehicles to enable the front wheels to be arranged upon the tubular carrier member, also with drawn vehicles having no driving device, the front wheels are supported in a manner known per se upon short stub-shafts adapted to swivel about vertical axes, which are carried by the ends of the swinging axles.

Figure 5:
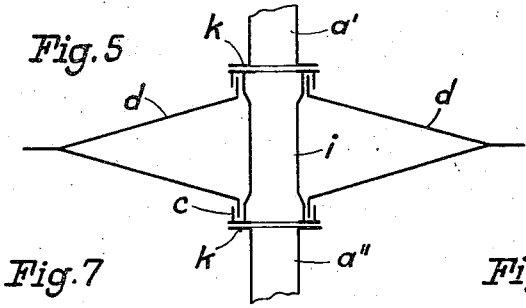
Fig. 5 shows a third constructional form of the invention in plan.

In the constructional example illustrated in Fig. 5 the inner ends of the half-axles d are connected to a part i which preferably serves simultaneously for fixing the supporting springs. The supporting part i is inserted between the ends of two tubular sections a', a", forming a part of the carrier member and is rigidly connected with the same, for example by means of flanges k.

The axle-constructions described above and illustrated in Figs. 1–5 are mainly designed for drawn vehicles in contradistinction to driven vehicles, that is for trailers to loaded power-vehicles. The invention however is also advantageously applicable for power-vehicles having their own drive, in which cases without any modification of the drive or of the driving shaft bearings and so forth the invention facilitates the provision of further supporting wheels at any desired parts besides the already present driven wheels.

Figure 7:
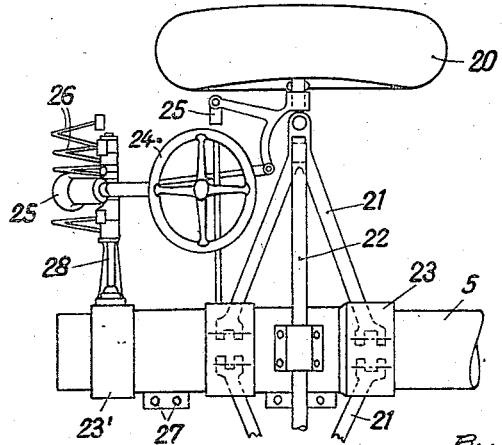
Fig. 7 is a plan of the front part of the same chassis.
Figure 8:
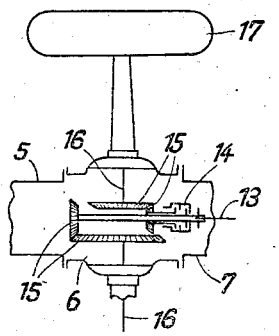
Fig. 8 is a diagrammatic representation of the drive of one axle.
Figure 6:
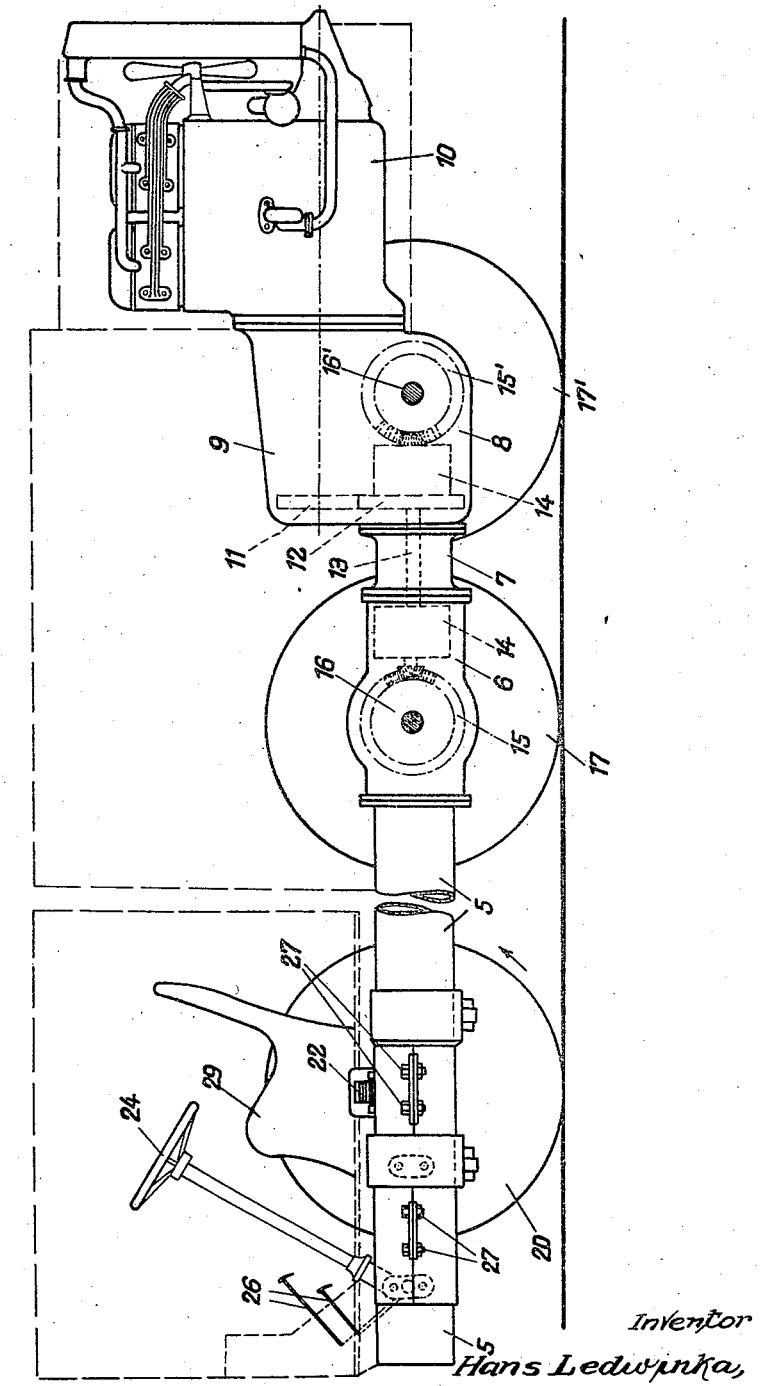
Fig. 6 is a side view of the general construction of a chassis.

In the constructional example illustrated in Figs. 6 and 7 the vehicle frame consists of the tube 5, the front differential casing 6, the intermediate tube 7 and the rear differential casing 8. The rear differential casing 8 can be combined with the change-gear casing 9. At the rear end of the tubular vehicle frame formed by the casing 8, 9, and casing 10 of the internal combustion engine is connected by means of a flange.

The movement of the crank-shaft of the internal combustion engine is transmitted through the change-gear and a pair of pinions 11, 12 to a shaft 13 supported in the tubular carrier member and from thence to the equalizing gearing 14, 14'. The equalizing gears then remain in connection with the driven wheels 17 or 17' through pairs of bevel wheels 15 or 15' and rotatable cross-shafts 16 or 16'.

The transmission from the crank-shaft to the driven wheels may be effected in various ways, for instance by the use of a plurality of shafts arranged parallel to one another or by means of a shaft extending beyond the rear axle.

The change-gear casing may be fixed, in contra-distinction to the construction illustrated, in a supporting bearing at the rear end of the tubular vehicle-frame formed by the differential casing 8, so that then the engine is mounted upon the change-gear casing or again is detachably secured to the rear end of the same. Finally the change-gear casing can also be arranged in front of the rear axle.

The front wheels 20 are carried by swinging axles 21 and are supported by a transverse spring 22. The swinging axles 21 and transverse spring 22 are fixed to a tubular carrier member 23 which is pushed over the tubular carrier member 5, so that the wheels together with axles and spring can be removed as one unit from the front end of the tube 5.

The steering wheel 24 together with steering device 25, brake and gas pedals 26 and the like, are likewise carried by a tubular body 23' pushed over the tube 5 and preferably connected with the tube 23. For fixing the parts the tubular members 23, 23' are preferably slotted and can be rigidly clamped upon the tube 5 by means of screws 27 engaging on both sides of the slot. The carrier 28 for the steering wheel connected with the tubular member 23', also the pedals and the like, can be arranged either upon the left or upon the right side. The driver's seat 29, and under certain circumstances the entire driver's box, can be combined with the tubular members 23, 23', and together with the same be dismountable as a whole from the remaining parts of the vehicle.

I claim:—

1. In a vehicle having a single central longitudinal tubular member per se constituting the frame proper of the vehicle, a unitary detachable steering assembly comprising a pair of non-driven steerable road wheels, a bracket detachably secured to said tubular frame constituting member, resilient transverse suspension means anchored to said bracket and carried by said wheels supporting said tubular member solely through said bracket, and a steering mechanism, said mechanism being supported on said tubular member through said bracket, said assembly of the bracket, wheels, suspension means, and steering mechanism being capable of being removed from said tubular frame constituting member as an assembled unit by the single operation of detaching said bracket from said tubular frame constituting member.

2. In a vehicle having a single central longitudinal tubular member, per se, constituting the frame proper of the vehicle, a unitary detachable steering assembly comprising a pair of non-driven steerable road wheels, a bracket detachably secured to said tubular frame-constituting member, resilient transverse suspension means anchored to said bracket and carried by said wheels supporting said tubular member solely through said bracket, a steering mechanism, and means, for controlling the brakes and the supply of fuel to the driving plant of the vehicle, said steering mechanism and controlling means being supported on said tubular member through said bracket, said assembly of the bracket, wheels, suspension means, steering mechanism and controlling means being removable from said tubular frame-constituting member as an assembled unit by the single operation of detaching said bracket from said tubular frame-constituting member.

HANS LEDWINKA.